(12) United States Patent
Fujita et al.

(10) Patent No.: US 10,118,323 B2
(45) Date of Patent: Nov. 6, 2018

(54) MANUFACTURING METHOD OF INTEGRATED FOAM-MOLDED PRODUCT

(71) Applicant: Delta Kogyo Co. Ltd., Aki-gun (JP)

(72) Inventors: Etsunori Fujita, Higashihiroshima (JP); Yumi Ogura, Higashihiroshima (JP); Seiji Kawasaki, Higashihiroshima (JP); Shigeki Wagata, Hiroshima (JP); Yoshimi Enoki, Aki-gun (JP)

(73) Assignee: Delta Kogyo Co. Ltd., Aki-gun (JP)

( * ) Notice: Subject to any disclaimer, the term of this patent is extended or adjusted under 35 U.S.C. 154(b) by 762 days.

(21) Appl. No.: 14/479,626

(22) Filed: Sep. 8, 2014

(65) Prior Publication Data

US 2015/0072107 A1   Mar. 12, 2015

(30) Foreign Application Priority Data

Sep. 10, 2013   (JP) ................................. 2013-187628

(51) Int. Cl.
*B29C 44/16* (2006.01)
*B29D 99/00* (2010.01)
(Continued)

(52) U.S. Cl.
CPC .......... *B29C 44/16* (2013.01); *B29C 44/1228* (2013.01); *B29C 44/1276* (2013.01);
(Continued)

(58) Field of Classification Search
CPC ............................ B29C 44/16; B29C 44/1276
See application file for complete search history.

(56) References Cited

U.S. PATENT DOCUMENTS 5,173,227 A   12/1992   Ewen et al.
5,273,698 A   12/1993   Thary
(Continued)

FOREIGN PATENT DOCUMENTS

AU             2961471 A    12/1972
DE   10 2011 009 089 A1    1/2012
(Continued)

OTHER PUBLICATIONS

Partial European Search Report dated Apr. 23, 2015 in Patent Application No. 14183902.7.

*Primary Examiner* — Benjamin A Schiffman
(74) *Attorney, Agent, or Firm* — Oblon, McClelland, Maier & Neustadt, L.L.P.

(57) ABSTRACT

To obtain an integrated foam-molded product whose manufacturing cost is reduced and which makes an effective use of a property of an integration target. Foaming heat generated at the time of the foaming of a polyurethane foam raw material, whose influence has been conventionally prevented by contriving a special measure, is positively used. The integration target is influenced by foaming heat generated at the time of the foaming of the polyurethane foam raw material in a mold, to thermally deform into a desired shape along a mold shape. Consequently, it is possible to mold the integration target into an arbitrary shape in a step of integrating the integration target with a polyurethane foam layer in the mold by integrated foaming, and therefore, there is no need to work the integration target to a state closer to a final shape in a step before it is disposed in the mold, which can simplify manufacturing steps and reduce manufacturing cost.

5 Claims, 12 Drawing Sheets

(51) Int. Cl.

| | | |
|---|---|---|
| *B29C 44/12* | (2006.01) | |
| *B32B 3/26* | (2006.01) | |
| *B32B 5/02* | (2006.01) | |
| *B32B 5/20* | (2006.01) | |
| *B32B 5/24* | (2006.01) | |
| *B32B 27/06* | (2006.01) | |
| *B32B 27/40* | (2006.01) | |
| *B60N 2/64* | (2006.01) | |
| *B29L 31/58* | (2006.01) | |
| *B29K 75/00* | (2006.01) | |
| *B29K 275/00* | (2006.01) | |
| *B29L 9/00* | (2006.01) | |

(52) U.S. Cl.
CPC .......... *B29D 99/0092* (2013.01); *B32B 3/266* (2013.01); *B32B 5/022* (2013.01); *B32B 5/024* (2013.01); *B32B 5/026* (2013.01); *B32B 5/20* (2013.01); *B32B 5/245* (2013.01); *B32B 27/065* (2013.01); *B32B 27/40* (2013.01); *B60N 2/64* (2013.01); *B29C 44/1209* (2013.01); *B29C 44/1214* (2013.01); *B29K 2075/00* (2013.01); *B29K 2275/00* (2013.01); *B29K 2713/00* (2013.01); *B29L 2009/00* (2013.01); *B29L 2031/58* (2013.01); *B32B 2250/03* (2013.01); *B32B 2305/022* (2013.01); *B32B 2605/003* (2013.01); *D10B 2403/021* (2013.01); *D10B 2505/08* (2013.01); *Y10T 428/24314* (2015.01); *Y10T 428/249953* (2015.04); *Y10T 442/3325* (2015.04); *Y10T 442/469* (2015.04); *Y10T 442/647* (2015.04)

(56) References Cited

U.S. PATENT DOCUMENTS

| | | | |
|---|---|---|---|
| 2004/0168479 A1* | 9/2004 | McMurray | D02G 3/326 66/202 |
| 2008/0309143 A1 | 12/2008 | Booth et al. | |
| 2010/0229606 A1 | 9/2010 | Ikenaga et al. | |

FOREIGN PATENT DOCUMENTS

| | | |
|---|---|---|
| EP | 1 988 197 A1 | 11/2008 |
| FR | 2 094 092 A1 | 2/1972 |
| JP | 3-41992 A | 2/1991 |
| JP | 2003-94543 A | 4/2003 |
| JP | 2004-268406 A | 9/2004 |

* cited by examiner (a)

(b)

(c)

(d)

(e)

(a)

(b)

MANUFACTURING METHOD OF INTEGRATED FOAM-MOLDED PRODUCT

BACKGROUND OF THE INVENTION

1. Field of the Invention

Embodiments of the present invention relate to a manufacturing method of an integrated foam-molded product and an integrated foam-molded product, and more particularly relate to a manufacturing method for obtaining an integrated foam-molded product with a polyurethane foam layer, and an integrated foam-molded product.

2. Description of the Related Art

As a seat cushion, a seat back, a headrest, and so on of a vehicle seat, a skin-integrated foam-molded product whose skin layer and polyurethane foam layer are molded by integrated foaming is known. For example, Patent Document 1 and Patent Document 2 disclose those in which a skin material, a wadding material, a resin film (raw material shielding layer), and polyurethane foam as a cushion material are stacked, and the resin film is used in order to prevent a foamable raw material of the polyurethane foam from permeating the wadding material.

Further, foaming heat and carbon dioxide gas are generated during the foam-molding of the polyurethane foam raw material, though not explicitly pointed out in Patent Documents 1, 2. The foaming heat sometimes damages the skin material, and the carbon dioxide gas increases an internal pressure in a mold, which sometimes causes the generation of voids and the like. Therefore, the exhaust from an exhaust hole provided in an upper mold is generally performed during the manufacture. However, there is a problem of leakage of the foaming polyurethane foam raw material through this exhaust hole, and in order to prevent such problems, Patent Document 3 proposes a molding method in which a skin layer having air permeability is provided on an upper mold in which an exhaust hole is formed.

Patent Document 1: Japanese Patent Application Laid-open No. 2003-94543

Patent Document 2: Japanese Patent Application Laid-open No. 2004-268406

Patent Document 3: Japanese Patent Application Laid-open No. Hei 3-41992

As is apparent from the fact that Patent Document 3 proposes the way to smoothly perform the exhaust from the exhaust hole, when the polyurethane foam layer and the other members are integrated, the foaming is heat and the gas (carbon dioxide gas) generated at the time of the foaming of the polyurethane foam raw material cause the occurrence of a defect in a molded product, and at a manufacturing and development site, it has conventionally been a general practice to put an importance on minimizing influences of these.

Further, the other members integrated with the polyurethane foam layer, for example, the skin material, the wadding material, and so on are basically only adhering to the polyurethane foam layer, and their shapes are in principle fixed in a working step prior to the foam molding, though influenced by a foaming pressure of the polyurethane foam raw material. Therefore, at the time of the foam molding, it has been necessary to contrive a measure, such as the smooth exhaust from the exhaust hole, in order to prevent the aforesaid foaming heat and gas from affecting the other members that are to be integrated.

SUMMARY OF THE INVENTION

The present invention was made in consideration of the above circumstances, and has an object to provide a manufacturing method of an integrated foam-molded product which is capable of positively controlling the shape of another member (hereinafter, referred to as "integration target") that is to be integrated with a polyurethane foam layer, at the time of foam molding, simplifying a working step of the integration target prior to the foam molding, and reducing manufacturing cost, and to provide an integrated foam-molded product.

In order to solve the aforesaid problem, a manufacturing method of an integrated foam-molded product according to one embodiment of the present invention is a manufacturing method of an integrated foam-molded product which injects a polyurethane foam raw material into a mold to foam the polyurethane foam raw material and integrates an integration target disposed in the mold with a polyurethane foam layer, the method including thermally deforming the integration target by foaming heat generated at the time of the foaming of the polyurethane foam raw material to mold the integration target into a predetermined shape, and obtaining an integrated foam-molded product in which the integration target is integrated with the polyurethane foam layer.

Preferably, the integration target is made of a three-dimensional structure having air permeability, and is molded into the predetermined shape by the thermal deformation while a pressure of gas generated at the time of the foaming of the polyurethane foam raw material is used for shape retention of the three-dimensional structure.

Preferably, the three-dimensional structure is a three-dimensional fabric made of a woven fabric, a knitted fabric, or a nonwoven fabric, or is slab urethane. Preferably, the integration target is a skin layer-joined three-dimensional structure having a skin layer joined to at least part of the three-dimensional structure.

Preferably, the three-dimensional structure forming the skin layer-joined three-dimensional structure partly has a sparse portion that is formed as a sparser structure than a peripheral portion or formed as a void, and the polyurethane foam layer is fixed to the skin layer through the sparse portion. Preferably, the skin layer and the three-dimensional structure forming the skin layer-joined three-dimensional structure are joined to each other by sewing or melt adhesion, or via a hook-and-loop fastener. Preferably, as the three-dimensional fabric forming the three-dimensional structure, a three-dimensional knitted fabric having a pair of ground knitted fabrics and a connecting yarn knitted back and forth between the ground knitted fabrics is used.

Preferably, as the three-dimensional knitted fabric, a gray fabric not having undergone a heat setting process is used. Preferably, when the skin layer is joined to the gray fabric of the three-dimensional knitted fabric, the skin layer is joined so as to have a slack relatively to the gray fabric between joined portions. Preferably, part of the ground knitted fabric included in the three-dimensional knitted fabric is disposed in the polyurethane foam layer. Preferably, the method is applied to manufacturing of an integrated foam-molded product forming a seat cushion, a seat back, a headrest, or an armrest of a vehicle seat.

An integrated foam-molded product according to one embodiment of the present invention includes: a skin layer-joined three-dimensional structure having a skin layer joined to at least part of a three-dimensional structure having air permeability; and a polyurethane foam layer which is stacked on the three-dimensional structure in the skin layer-joined three-dimensional structure by integrated foaming.

Preferably, the three-dimensional structure is a three-dimensional fabric made of a woven fabric, a knitted fabric, or a nonwoven fabric, or is slab urethane. Preferably, the three-dimensional fabric forming the three-dimensional structure is a three-dimensional knitted fabric having a pair of ground knitted fabrics and a connecting yarn knitted back and forth between the ground knitted fabrics. Preferably, the polyurethane foam layer is integrated in a foaming state with the ground knitted fabric located on a boundary surface of the polyurethane foam layer with the three-dimensional knitted fabric. Preferably, part of the ground knitted fabric included in the three-dimensional knitted fabric is disposed in the polyurethane foam layer. Preferably, the integrated foam-molded product is used for a seat cushion, a seat back, a headrest, or an armrest of a vehicle seat.

Further, preferably, in a range where the three-dimensional structure having the air permeability continues, a slit is formed in the polyurethane foam layer, and at least one of one side and the other side across the slit is displaceable according to a shape and a size of the slit. Further, preferably, the integrated foam-molded product is used for the seat cushion of the vehicle seat, the slit is formed in a shape obtained when a portion, of the polyurethane foam layer, located at a position deviated toward a front edge from a front-rear direction center portion is cut out along a left and right direction of the seat cushion from a rear surface side, and a front side across the slit is supported by a cushion frame of the seat cushion to enable a rear side across the slit to displace according to a slit width.

DETAILED DESCRIPTION OF THE PREFERRED EMBODIMENTS

Figure 1:
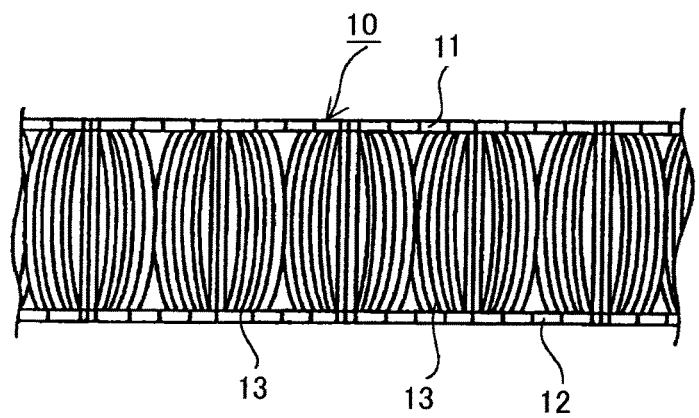
FIG. 1 is a cross-sectional view illustrating an example of a three-dimensional knitted fabric being an integration target according to one embodiment of the present invention.

In the present invention, an integration target is disposed in a mold, a polyurethane foam raw material is injected, and they are molded. At this time, when the polyurethane foam raw material foams, foaming heat is generated due to a reaction. Since this foaming heat reaches around 100° C. on a surface and around 160° C. at a center portion, it is possible to mold the integration target into a desired shape by making an effective use of this heat. For example, the heat is stored by closing at least part of an exhaust hole of the mold or surrounding the surface of the mold by a heat insulator, and an action of a foaming pressure of the polyurethane foam raw material is also used. Consequently, the integration target can be thermally deformed along an inner surface of the mold and can be molded into the desired shape. Incidentally, depending on the temperature of the foaming heat, it is also possible to thermally deform the integration target by preliminary heating the mold or heat-controlling the mold.

As the integration target, one made of a three-dimensional structure having air permeability is usable. In this case, by controlling the opening/closing or the opening degree of the exhaust hole of the mold as described above, a predetermined amount of gas (carbon dioxide gas) generated at the time of the foaming of the polyurethane foam raw material remains in the mold. When the three-dimensional structure having air permeability is used, this gas flows inside the three-dimensional structure and therefore acts as a resistance force that holds back the entrance of the foaming pressure of the polyurethane foam raw material to the three-dimensional structure. As a result, the three-dimensional structure having air permeability is molded into an arbitrary shape while its shape is retained by the pressure of this gas. If the three-dimensional shape of the three-dimensional structure having air permeability thermally deforms into the desired shape along the inner surface of the mold while its designed shape is retained, an obtained integrated foam-molded product with a polyurethane foam layer has almost the same property as the property that the three-dimensional structure having air permeability originally has since the impregnation of the polyurethane foam layer stops at a ground fabric surface (ground knitted fabric) of a knit structure. For example, one having predetermined elasticity can retain almost the same elasticity as that prior to the integration.

Incidentally, the control of the gas pressure can be arbitrarily decided according to a material and size (area, thickness, or the like) of the integration target, the shape, size, or the like of the polyurethane foam layer, or the like, and the gas pressure can be adjusted to a high pressure by completely closing the exhaust hole, or can be adjusted to a predetermined pressure by controlling the opening degree of the exhaust hole. Conventionally, an importance has been put on discharging the gas from the exhaust hole as quickly as possible, but in the present invention, this gas is rather made to stay in the mold and its pressure is used for the molding of the integration target.

As the three-dimensional structure having air permeability being the integration target, a three-dimensional fabric made of a woven fabric, a knitted fabric, or a nonwoven fabric, or slab urethane is usable. Any of these has high air permeability and can retain a predetermined three-dimensional shape. In the case of the slab urethane, one having a structure whose air permeability is more enhanced by drilling the slab urethane or by melting a cell membrane is usable.

Further, any of these is preferably used in the form of a skin layer-joined three-dimensional structure in which a skin layer is joined to at least part of the three-dimensional structure. Consequently, the polyurethane foam layer and the skin layer are integrated via the three-dimensional structure having air permeability. Further, preferably, a sparse portion formed as a sparser structure than a peripheral portion or as a void is formed in at least part of the three-dimensional structure, and a part in which the polyurethane foam layer is directly fixed to the skin layer through this sparse portion is provided. Consequently, the skin layer and the polyurethane foam layer are joined in this part, and a pull-in shape or a concave (negative shape) of the skin layer can be easily formed and retained. Further, depending on the size, shape, or the like of the sparse portion, it is possible to easily form concaves/convexities such as ridges and dimples on the surface of the integrated foam-molded product. That is, only by the integrated foaming of the polyurethane foam raw material with the skin layer-joined three-dimensional structure, the foaming polyurethane foam layer enters the sparse portion, and depending on the size, shape, or the like of the sparse portion, a predetermined surface shape can be easily obtained, which can contribute to the simplification of manufacturing steps and cost reduction.

In a case of a later-described three-dimensional knitted fabric, the sparse portion can be formed as follows, for example. That is, the arrangement density of connecting yarns knitted back and forth between ground knitted fabrics is reduced, or in a partial region, the connecting yarns are knitted inside the ground knitted fabrics instead of being knitted back and forth between the ground knitted fabrics. Incidentally, as the skin layer, fabric, genuine leather, synthetic leather, or the like is usable, but it is not particularly limited. As a means for joining the skin layer to at least part of the three-dimensional structure, a joining means by melt adhesion or via a hook-and-loop fastener is applicable, but as a simple joining means, a sewing means is preferably used.

Further, as the three-dimensional structure having air permeability, various kinds are used as described above, but when the slab urethane is used, if a foamable raw material of the polyurethane foam is integrally foamed, the foamable raw material of the polyurethane foam which is a raw material of the same kind as that of the slab urethane partly impregnates the slab urethane, so that a hardened layer is formed. This influences the skin layer depending on the thickness of the slab urethane, which will be a cause of a feeling of foreign matter when it is touched or will be a cause to generate a crease in the skin layer. Therefore, when the integrated molded product obtained by the present invention is a product touched by a human body, for example, when it is a product such as a seat cushion, a seat back, a headrest, or an armrest in a vehicle seat of an automobile, an airplane, a train, a ship, a bus, or the like, a three-dimensional fabric made of a woven fabric, a knitted fabric, or a nonwoven fabric is preferably used as the three-dimensional structure having air permeability. Above all, a three-dimensional knitted fabric having appropriate stiffness and elasticity in a compression direction and a plane direction is more preferably used.

The three-dimensional knitted fabric is formed by connecting a pair of ground knitted fabrics disposed apart from each other by connecting yarns. Concretely, as illustrated in FIG. 1, a three-dimensional knitted fabric 10 is formed by a three-dimensional structure having a pair of ground knitted fabrics 11, 12 disposed apart from each other and many connecting yarns 13 connecting the pair of ground knitted fabrics 11, 12 by being knitted back and forth therebetween.

Figure 2:
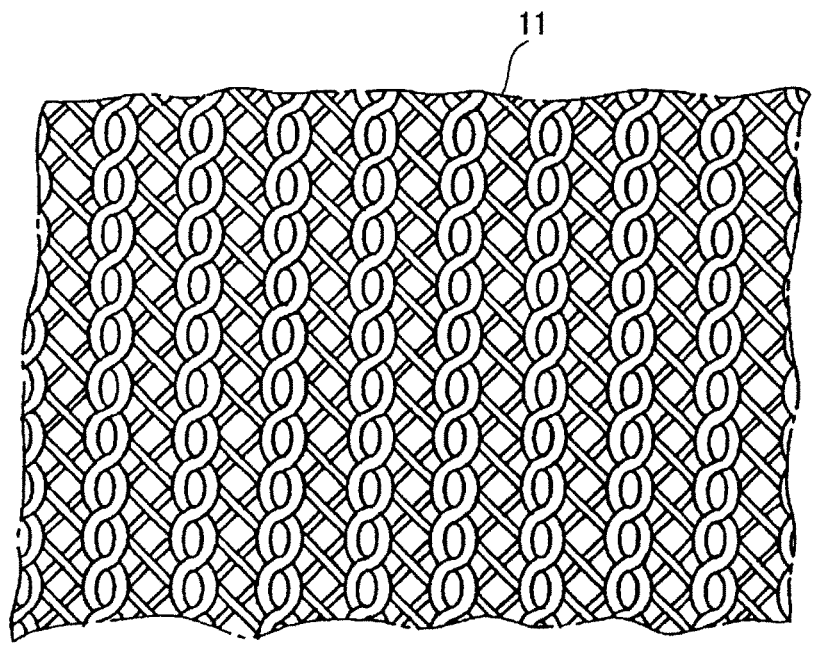
FIG. 2 is a view illustrating an example of a ground knitted fabric of the three-dimensional knitted fabric.
Figure 3:
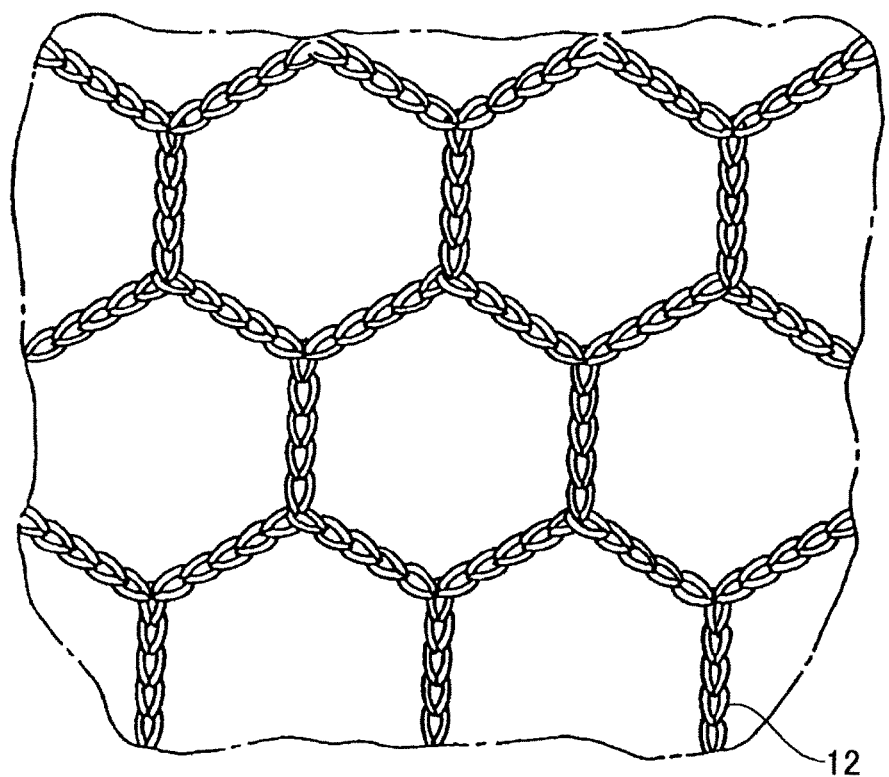
FIG. 3 is a view illustrating another example of the ground knitted fabric of the three-dimensional knitted fabric.
Figure 4:
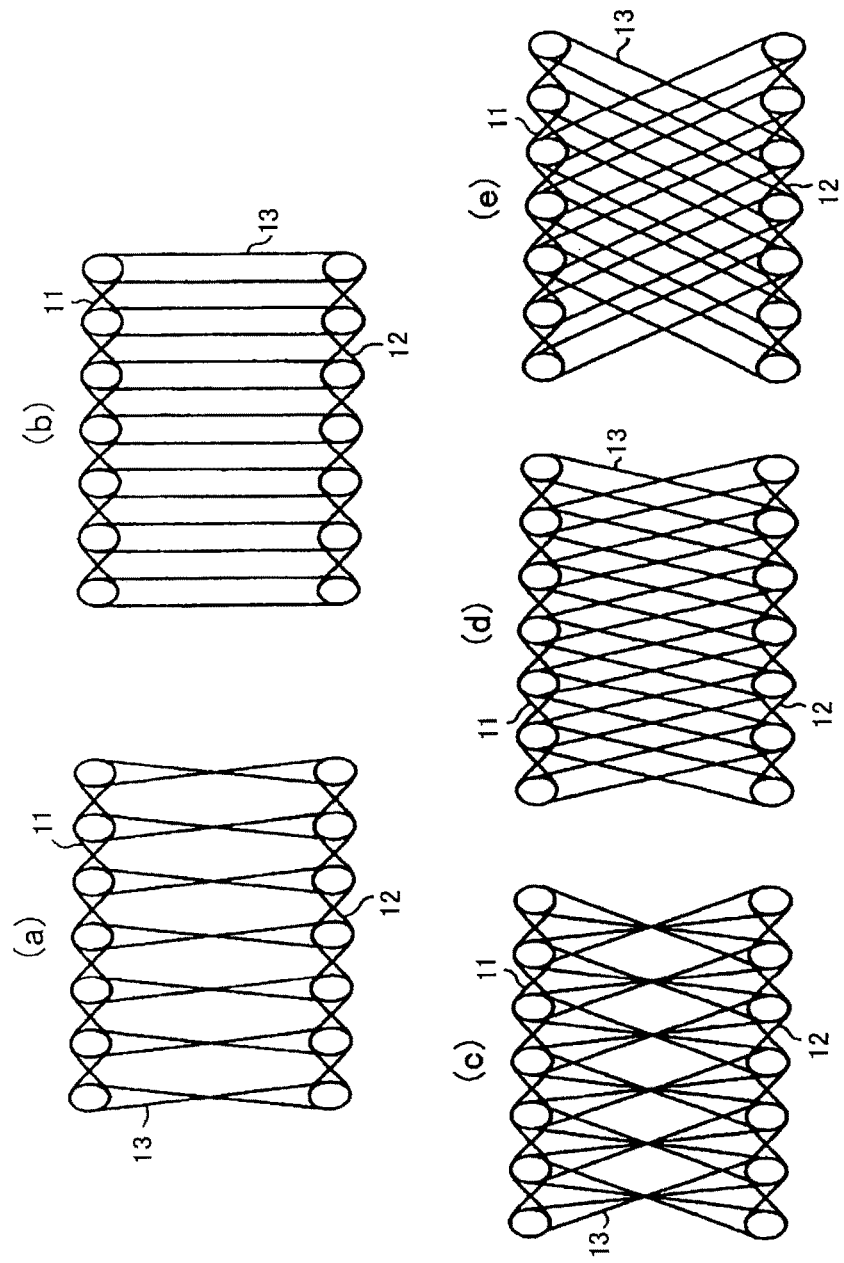
FIG. 4(a) to FIG. 4(e) are views illustrating various examples of how connecting yarns are arranged.
Figure 5:
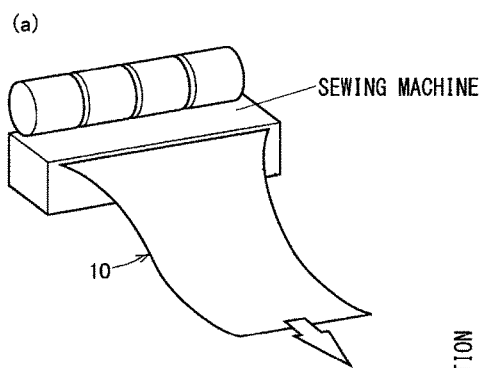
FIG. 5(a) to FIG. 5(e) are explanatory views of an example of steps up to a step of cutting the three-dimensional knitted fabric after it is knitted.
Figure 5:
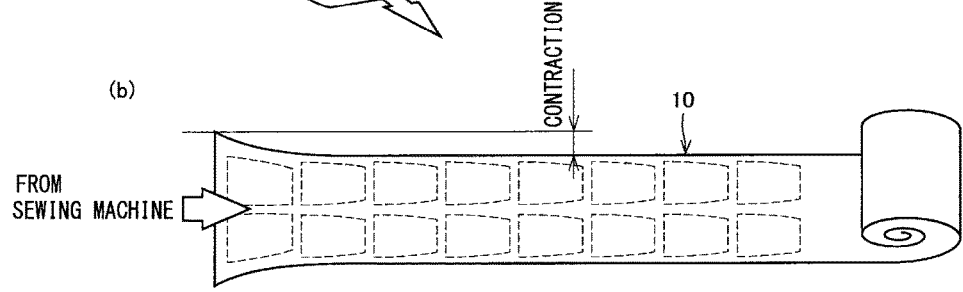
Figure 5:
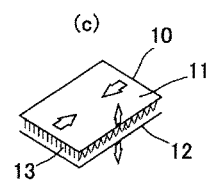
Figure 5:
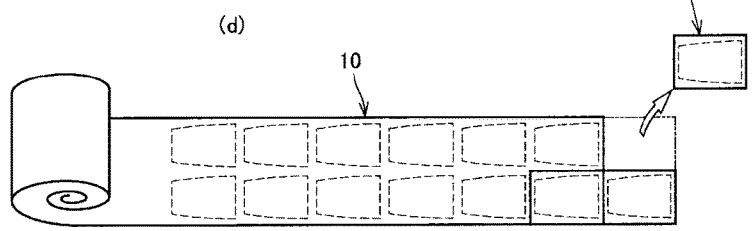
Figure 5:
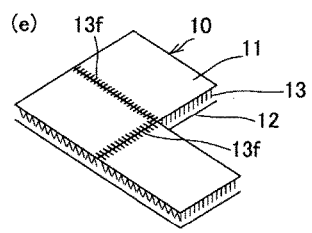

The ground knitted fabric 11 is formed by a flat knitted fabric structure (fine mesh) continuous both in a wale direction and a course direction by using yarns made of twisted monofilaments, as illustrated in FIG. 2, for instance. On the other hand, the other ground knitted fabric 12 is formed as a structure having a honeycomb-shaped (hexagonal) mesh with a larger mesh than that of the ground knitted fabric 11, by using yarns made of twisted staple fibers, as illustrated in FIG. 3, for instance. Of course, these knitted fabric structures are only examples, and a knitted fabric structure other than the fine-mesh structure and the honeycomb-mesh structure can also be adopted, or the ground knitted fabric 11 and the other ground knitted fabric 12 can be formed from the same knitted fabric structure.

The connecting yarns 13 are knitted between the pair of ground knitted fabrics 11, 12 so that the ground knitted fabric 11 and the other ground knitted fabric 12 are kept apart from each other by a predetermined interval, and gives predetermined stiffness to the three-dimensional knitted fabric 10 formed as a three-dimensional mesh knit.

The thickness and so on of ground yarns forming the ground knitted fabrics 11, 12 are selected within a range so as to be capable of giving necessary stiffness to the three-dimensional knitted fabric and so as not to make a knitting work difficult. Further, as the ground yarns, monofilament yarns can also be used, but in view of texture feeling, soft touching feeling of a surface, and so on, multifilament yarns are preferably used. If damping is reduced and a priority is given to an elastic property, the use of spun yarns is preferable.

The three-dimensional knitted fabric 10 supports a load not only by the deformation and a restoring force of stitches forming the ground knitted fabrics 11, 12 but also by the deformation (tilting and buckling) of the connecting yarns 13 and a restoring force of the connecting yarns 13 which are adjacent to the deformed connecting yarns 13 and give a spring property to the deformed connecting yarns 13. In addition, since the damping force or the like also acts due to the rubbing of the connecting yarns 13, the three-dimensional knitted fabric 10 has a flexible structure in which stress concentration does not occur owing to a soft spring property if a pressed area is small (for example, the area when it is pressed by a pressure plate with a 30 mm diameter), while exhibiting high stiffness when a pressing area is large (for example, the area when it is pressed by a pressure plate with a 200 mm diameter). Therefore, as the connecting yarns 13 that can suitably exhibit such a function, those whose thickness is a 167 to 1110 decitex are preferably used. When the thickness is less than 167 decitex, stiffness cannot be easily obtained, and when the thickness is over 1110 decitex, hardness becomes too high and it is difficult to obtain appropriate elasticity. Further, multifilament yarns can also be used, but the use of monofilament yarns is preferable because such desired elasticity can be easily obtained.

As materials of the ground yarns forming the ground knitted fabrics 11, 12 or of the connecting yarns 13, those of various kinds can be used, and examples thereof are synthetic fibers and regenerated fibers such as polypropylene, polyester, polyamide, polyacrylonitrile, and rayon, and natural fibers such as wool, silk, and cotton. The aforesaid materials may be each used solely or they may be used in arbitrary combination. Preferably used are thermoplastic polyester-based fibers represented by polyethylene terephthalate (PET), polybutylene terephthalate (PBT), and the like, polyamide-based fibers represented by nylon 6, nylon 66, and the like, polyolefin-based fibers represented by polyethylene, polypropylene, and the like, or the combination of two kinds of these fibers or more. Incidentally, the polyester-based fibers are suitable because of their excellent recyclability. Further, the yarn shape of the ground yarns or the connecting yarns 13 is not limited, and they may be round cross-section yarns, modified cross-section yarns, or the like.

More concretely, the arrangement way of the connecting yarns 13 (piling structure) may be, for example, those illustrated in FIG. 4(a) to FIG. 4(e) which illustrate the connecting yarns 13 connecting the ground knitted fabrics 11, 12 seen from side surfaces. (a) and (b) illustrate straight types in which the connecting yarns 13 are knitted almost perpendicularly between the ground knitted fabrics 11, 12, and out of these, in (a), the connecting yarns 13 are straightly knitted in a figure of 8, and in (b), the connecting yarns 13 are knitted straightly in a simple manner. (c) to (e) illustrate crossing types in which the connecting yarns 13 are knitted so as to intersect in the middle between the ground knitted fabrics 11, 12, and out of these, (c) is a type in which the connecting yarns 13 are made to cross each other in the figure of 8, (d) is a type in which the connecting yarns 13 are knitted so as to cross each other in a simple manner, and (e) is a type in which the combinations each having the two connecting yarns 13 cross each other (double-cross). As illustrated in (c) to (e), when the connecting yarns 13 are made to intersect with each other to be obliquely arranged, it is possible to give a soft spring property with large compressibility while keeping a sufficient restoring force by buckling strength of the connecting yarns 13, as compared with the cases where the connecting yarns 13 are arranged substantially perpendicularly between the ground knitted fabrics 11, 12 (refer to (a) and (b)).

Incidentally, the connecting yarns 13 may form loop-shaped stitches in the ground knitted fabrics 11, 12 to be connected to these fabrics 11, 12, or there may be provided portions where they are hooked on the front-layer ground knitted fabric and the rear-layer ground knitted fabric by an insertion structure or where they are inserted in the ground knitted fabrics by knitting.

The use of the three-dimensional knitted fabric 10 facilitates increasing elasticity or increasing a damping property depending on the way it is knitted or the like. For example, when the ground knitted fabric 11 is formed, a damping ratio can be increased by the adjustment of the way of knitting and the thickness of the yarns, or the like, and when the other ground knitted fabric 12 is formed, it is possible to increase stiffness by making the stitches small to reduce a modulus of elasticity in its substantially widthwise center portion and to increase a restoration property by using yarns having a high restoring force in its side portions. Further, by using connecting yarns having a high restoring force and using their flexure, it is possible to enhance a restoration property. Further, by adjusting strength of knot fixing portions between the ground yarns forming the ground knitted fabrics 11, 12 and the connecting yarns 13 and using a frictional force of the both at the knot fixing portions, it is possible to adjust the damping property. Further, the arrangement density of the connecting yarns 13 knitted back and forth between the pair of ground knitted fabrics 11, 12 may be changed, thereby forming a structure whose stiffness in a plane direction partially differs. That is, in the peripheral portion, the connecting yarns 13 are knitted inside the ground knitted fabrics 11, 12 so that the connecting yarns 13 knitted back and forth between the ground knitted fabrics 11, 12 become relatively sparse or no connecting yarns 13 exist, and near the widthwise center, the connecting yarns 13 knitted back and forth between the ground knitted fabrics 11, 12 are made relatively dense, thereby increasing the arrangement density in a partial area.

Embodiment

Next, one embodiment of the present invention will be described based on FIG. 5 to FIG. 9. This embodiment is an example where an integrated foam-molded product used for a seat back 110 and a seat cushion 120 of an automobile seat 100 is manufactured (refer to FIG. 6(a)), in which a skin layer-joined three-dimensional structure as an integration target is integrated with a polyurethane foam layer 30, and the three-dimensional knitted fabric 10 is used as the three-dimensional structure.

First, FIG. 5(a) illustrates a state where the knitting of the three-dimensional knitted fabric 10 used in this embodiment is completed by a knitting machine. As illustrated in FIG. 5(b), a gray fabric of the three-dimensional knitted fabric 10 whose knitting is completed contracts in a width direction and expands in a roll direction. In this embodiment, the connecting yarns 13 are knitted back and forth between the ground knitted fabrics 11, 12 within ranges illustrated by the broken lines in FIG. 5(b), and in ranges outside the broken lines, parts 13f of the connecting yarns 13 are not knitted back and forth between the ground knitted fabrics 11, 12 but are inserted and knitted inside the ground knitted fabrics 11, 12, as illustrated in FIG. 5(c) and FIG. 5(e).

In the case where the three-dimensional knitted fabric 10 is used as a cushion member and so on, since the shape of the three-dimensional knitted fabric 10 in the gray fabric state is not fixed and has the contraction and the expansion as described above, a treatment called heat setting for fixing the shape by heat is generally performed while a tension is working, in order to eliminate an unstable state due to the contraction and expansion. However, in this embodiment, this heat setting treatment is not performed, and as illustrated in FIG. 5(d), the three-dimensional knitted fabric 10 is cut along the solid lines outside the broken line ranges where the connecting yarns 13 are knitted back and forth between the ground knitted fabrics 11, 12. Cutting the three-dimensional knitted fabric 10 outside the ranges where the connecting yarns 13 are knitted back and forth between the ground knitted fabrics 11, 12 has an advantage that cutting wastes are not likely to be produced at the time of the cutting.

Figure 6:
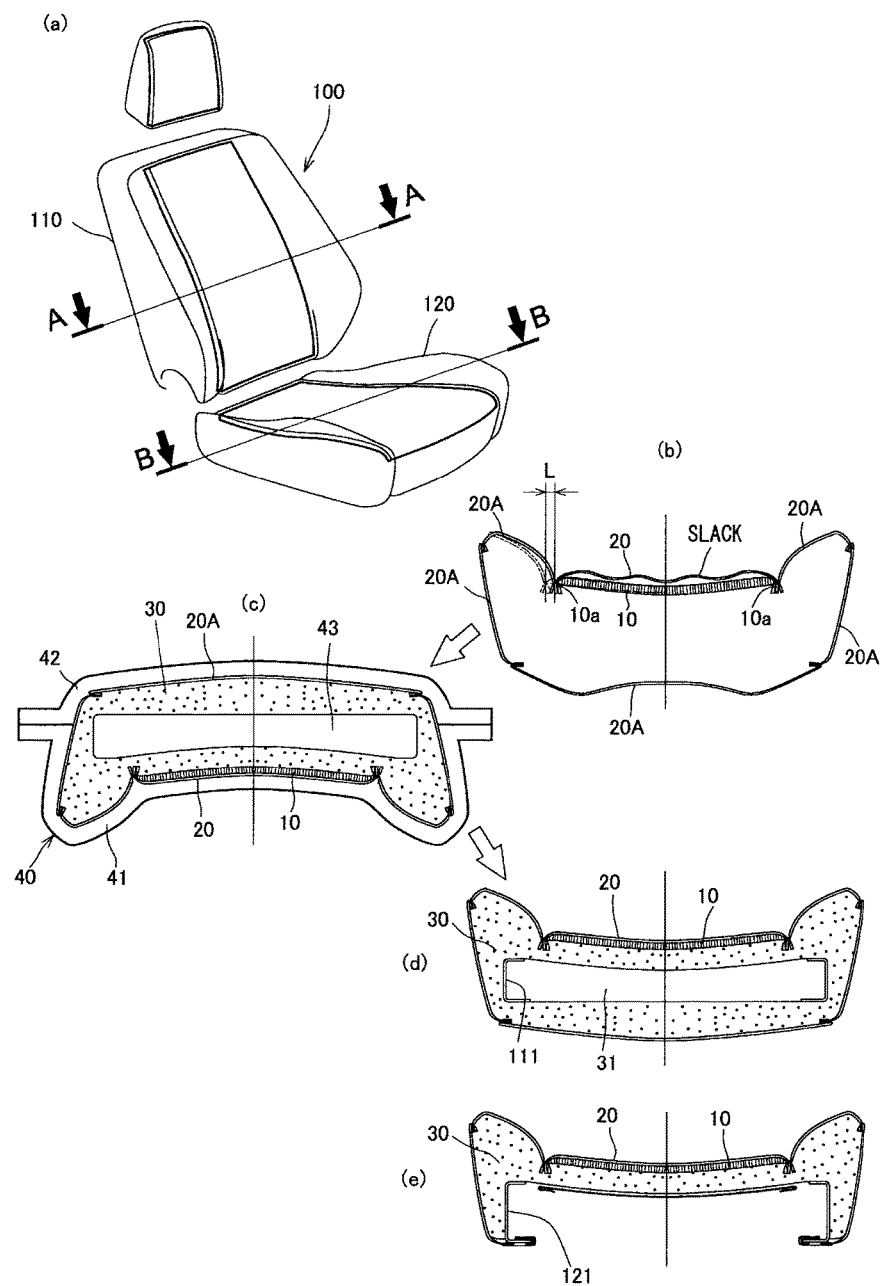
FIG. 6(a) to FIG. 6(e) are views illustrating steps of manufacturing a vehicle seat by using a skin layer-joined three-dimensional knitted fabric, (a) being a perspective view schematically illustrating the vehicle seat, (b) being a view illustrating a state where the three-dimensional knitted fabric in a gray fabric state is joined to a skin layer, (c) being a view illustrating a state where a polyurethane foam raw material foams to form a polyurethane foam layer, (d) being a cross-sectional view taken along A-A line in (a), and (e) being a cross-sectional view taken along B-B line in (a).

After the three-dimensional knitted fabric 10 is thus cut, the skin layer 20 is joined to one surface of the three-dimensional knitted fabric 10 as illustrated in FIG. 6(b). In this embodiment, the skin layer 20 is joined by sewing to the ranges having no connecting yarns 13 knitted back and forth between the ground knitted fabrics 11, 12, in the three-dimensional knitted fabric 10. The sewing is easy because the sewing is done in the ranges having no connection yarns 10. Incidentally, in the case where the gray fabric of the three-dimensional knitted fabric 10 is used, an expansion margin of the three-dimensional knitted fabric 10 has to be taken into consideration when the skin layer 20 is formed. That is, the three-dimensional knitted fabric 10 in the gray fabric state thermally deforms at the time of later-described integrated foaming to expand from the position of the solid line to the position of the two-dot chain line in FIG. 6(*b*). Therefore, the skin layer 20 longer in width than the three-dimensional knitted fabric 10 in the gray fabric state by a length corresponding to this expansion margin L used, that is, the skin layer 20 longer than a widthwise length between joint portions 10*a*, 10*a* of the three-dimensional knitted fabric in the gray fabric state is used, and the skin layer 20 is joined in a state where the skin layer 20 is in excess and has a slack when the skin layer 20 is joined to the joint portions 10*a*, 10*a*.

Further, as illustrated in FIG. 6(*b*), the skin layer 20 stacked on the three-dimensional knitted fabric 10 is disposed on a seat surface center of the seat back 110 or the seat cushion 120, and a plurality of other skin layers 20A located on a range corresponding to a range from its both side portions to its rear surface are sequentially joined by sewing, resulting in a bag shape.

Next, as illustrated in FIG. 6(*c*), the skin layer 20 to which the three-dimensional knitted fabric 10 is sewn is disposed so as to be in contact with a widthwise center of an inner surface of a lower mold 41 of a mold 40, and is disposed so that the skin layer 20A on the rear surface side is in contact with an inner surface of an upper mold 42. Incidentally, since the seat back 110 is formed in a hollow shape, a core 43 is disposed near the center of the mold 40. Further, in this embodiment, in order to adjust a gas pressure, about ¼ to about ⅓ of the whole gas-venting exhaust hole of the mold 40 is closed so that the gas is not discharged.

Next, the polyurethane foam raw material is injected. The polyurethane foam raw material foams after being injected, and the foaming heat is generated due to a reaction at this time. The temperature of this foaming heat reaches about 100° C. to about 160° C. as described above and in this embodiment, the opening degree of the exhaust hole is controlled, so that the heat is more difficult to escape than normally. Therefore, due to this foaming heat, the three-dimensional knitted fabric 10 deforms along an inner surface shape of the mold 40 to be thermally fixed. Similarly, the skin layer 20 is also molded into the shape along the inner surface of the mold 40 and also a reactive force from the three-dimensional knitted fabric 10 eliminates the slack of the skin layer 20. That is, the three-dimensional knitted fabric 10 does not undergo the heat setting treatment which is normally performed after it is knitted, but according to this embodiment, owing to the foaming heat generated at the time of the integrated foam-molding, the three-dimensional knitted fabric 10 is worked into the shape along the inner surface of the mold 40 to be fixed, so that the same effect as that of the heat setting can be obtained.

Therefore, according to this embodiment, by integrally foam-molding the polyurethane foam raw material and the integration target in the mold 40, it is possible to work the three-dimensional knitted fabric 10 and the skin layer 20 which are the integration target, into desired shapes. Therefore, a concave shape in which the seat surface center portion is dented is easily formed. That is, the heat setting treatment for eliminating the contraction of the three-dimensional knitted fabric 10 is not necessary as a step prior to the foam-molding, and in addition, a dedicated step for working the seat surface into a dented sectional shape (concave shape) is not necessary, which can simplify the manufacturing steps and reduce manufacturing cost. Incidentally, a means for more surely forming the concave shape will be further described later.

FIG. 6(*d*) illustrates a state where the integrated foam-molded product is released from the mold after the foam molding and a hollow portion 31 is filled in the back frame 111 (cross-sectional view taken along A-A line in FIG. 6(*a*)). In the obtained integrated foam-molded product, the polyurethane foam layer 30 scarcely entered gaps between the connecting yarns 13 of the three-dimensional knitted fabric 10, and the polyurethane foam raw material was foaming in a state of entering the ground knitted fabric 12 on the rear surface side. That is, the polyurethane foam layer 30 entered small gaps between yarns of the ground knitted fabric 12 of the three-dimensional knitted fabric 10 to foam and was firmly joined due to an anchoring effect, but scarcely entered the gaps between the connecting yarns 13. Therefore, since elasticity of the connecting yarns 13 functions substantially at the same level as that before the integration, an impregnation layer of the polyurethane foam layer 30 is not generated in the skin layer 20 and no feeling of foreign matter is felt. Owing to this property of the three-dimensional knitted fabric 10, even when the polyurethane foam layer 30 is thin, a formation area of a high-density layer formed in the polyurethane foam layer 30 is small and a foaming layer exists in the ground knitted fabric 12 being a boundary surface, which makes it possible to obtain a desired cushioning property. Further, integrating the skin layer 20 and the polyurethane foam layer 30 via the three-dimensional knitted fabric 10 makes it possible to reduce the thickness of the polyurethane foam layer 30 as compared with a case where the same cushioning property is obtained by the polyurethane foam layer 30 and the skin layer 20 without using the three-dimensional knitted fabric 10, which contributes to a weight reduction of the integrated foam-molded product (the seat back 110, the seat cushion 120, or the like).

FIG. 6(*e*) is a cross-sectional view taken along B-B line in FIG. 6(*a*), and illustrates the seat cushion 120 as the integrated foam-molded product in which the polyurethane foam layer 30 is molded by the integrated foaming on the skin layer-joined three-dimensional structure (structure in which the three-dimensional knitted fabric 10 is joined to the skin layer 20) in the same manner as the above, and the seat cushion 120 is supported by a cushion frame 121.

One reason why the property of the three-dimensional knitted fabric 10 can be thus effectively used in this embodiment is that the pressure of the gas generated at the time of the foaming is controlled by controlling the opening degree of the exhaust hole as described above. That is, due to elasticity of especially the connecting yarns 13 of the three-dimensional knitted fabric 10, the gas generated at the time of the foaming quickly flows in the gaps between the connecting yarns 13 of the three-dimensional knitted fabric 10, and its gas pressure acts substantially equally to the whole surfaces of the skin layer 20 and the three-dimensional knitted fabric 10. This gas pressure elastically resists a foaming pressure of the polyurethane foam raw material, which is useful for promoting the foaming of the polyurethane foam raw material, while suppressing its entrance of a large amount into the gaps between the connecting yarns 13.

Figure 7:
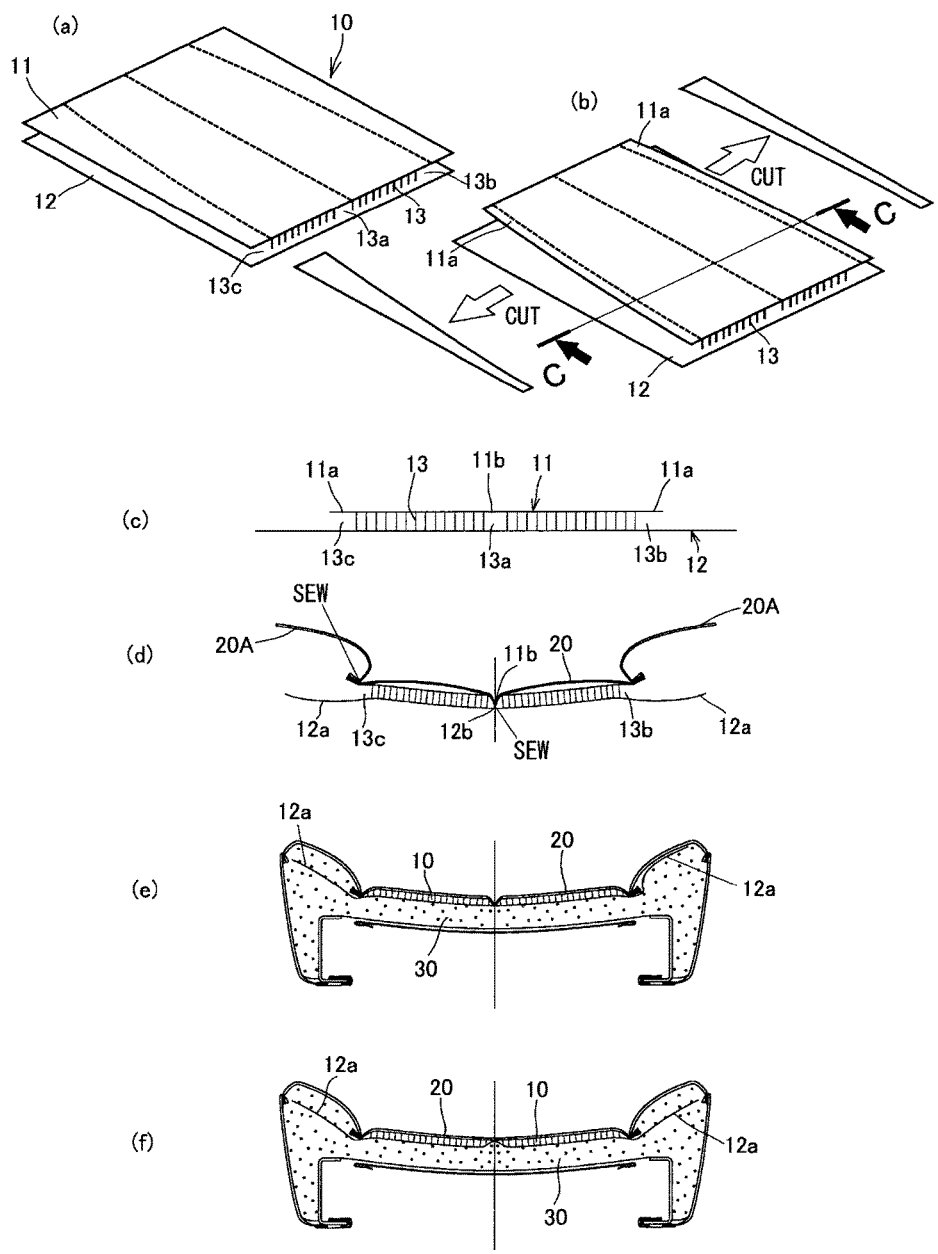
FIG. 7(a) to FIG. 7(f) are explanatory views of examples of steps of joining the skin layer to the three-dimensional knitted fabric to integrally mold them, (a) and (b) being views illustrating steps of cutting off excessive portions of one of the ground knitted fabrics, (c) being a cross-sectional view taken along C-C line in (b), (d) being a view illustrating a state where the skin layer is joined to the three-dimensional knitted fabric by sewing, (e) being a view illustrating an example of a state where the polyurethane foam layer foams, and (f) being a view illustrating another example of the state where the polyurethane foam layer foams.
Figure 8:
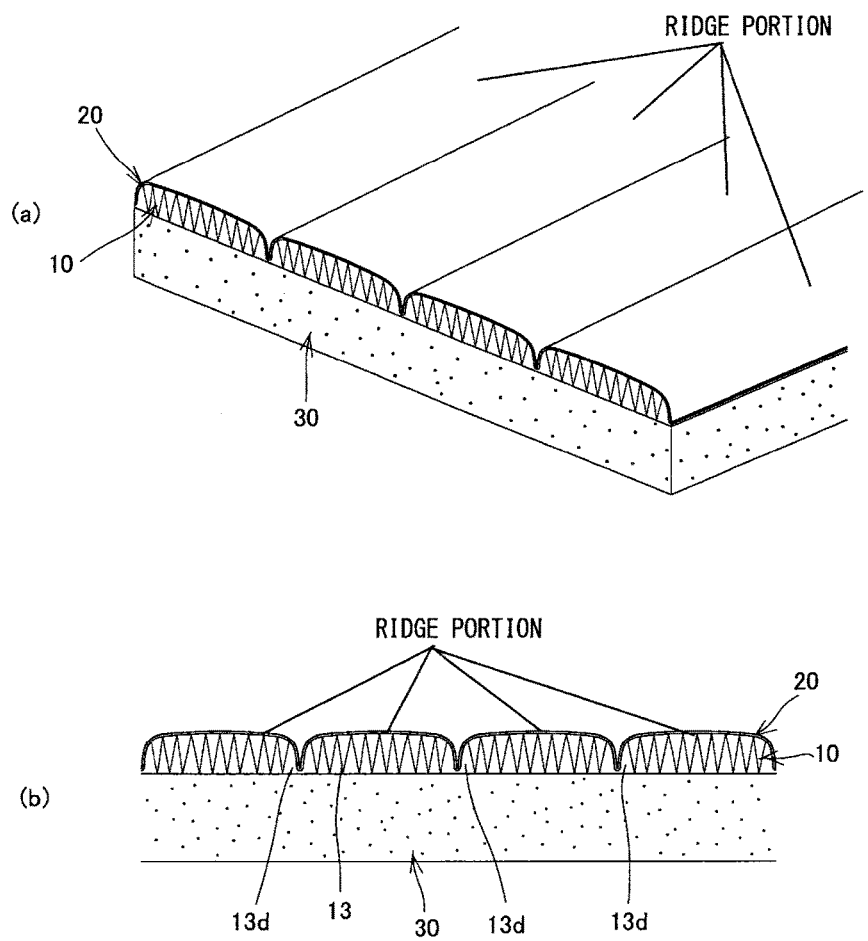
FIG. 8(a) is a perspective view illustrating a structure having ridge portions and FIG. 8(b) is a cross-sectional view thereof.
Figure 9:
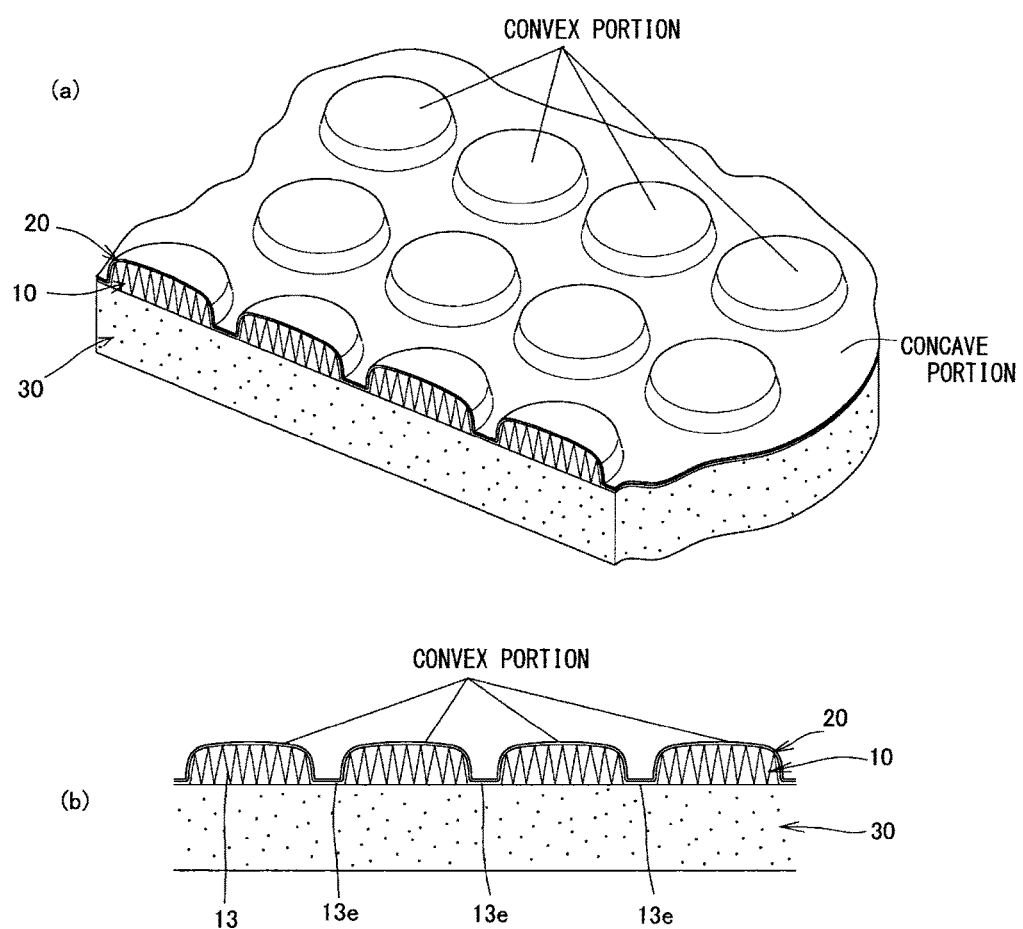
FIG. 9(a) is a perspective view illustrating a structure having convex portions and FIG. 9(b) is a cross-sectional view thereof.

FIG. 7(*a*) to FIG. 7(*f*) are explanatory views of methods for surely forming the concave shape in the seat surface. FIG. 7(*a*) illustrates the three-dimensional knitted fabric 10 in the gray fabric state cut into a predetermined shape. This three-dimensional knitted fabric 10 is knitted so that the connecting yarns 13 knitted back and forth between the ground knitted fabrics 11, 12 are provided in neither of a portion (sparse portion 13a) with a predetermined width along the center broken line and portions (sparse portions 13b, 13c) which are on outer sides of the broken lines near both side portions. As illustrated in FIG. 7(b) and FIG. 7(c), in both side portions of the ground knitted fabric 11, joint portions 11a, 11a serving as margins to seam are left and unnecessary portions on outer sides of the joint portions 11a, 11a are cut off. Next, as illustrated in FIG. 7(d), both side portions of the skin layer 20 are stitched to the joint portions 11a, 11a of the ground knitted fabric 11. At this time, edges of the adjacent skin layers 20A, 20A are also stitched together. On the other hand, since the sparse portion 13a along the center broken line has no connecting yarns 13, a center portion 11b of the ground knitted fabric 11 is sewn to a center portion 12b of the other ground knitted fabric 12 via the sparse portion 13a to be pulled in.

In this state, the obtained structure is set in the mold, and the polyurethane foam raw material is foamed, whereby the polyurethane foam layer 30 is formed. Incidentally, at this time, the foaming takes place while side portions 12a, 12a of the other ground knitted fabric 12 extend outward as illustrated in FIG. 7(e). Consequently, the polyurethane foam raw material enters the inside of the other ground knitted fabric 12 to foam and is integrated with the skin layers 20A on the both side portions. Incidentally, since one in which a wadding material made of slab urethane is laminated on a rear surface of fabric, synthetic leather, genuine leather, or the like is generally used as the skin layers 20A, the polyurethane foam raw material chemically reacts with the wadding material to impregnate at the time of its foaming, thereby being integrated with the skin layers 20A. As illustrated in FIG. 7(e), since the center portion 11b of the ground knitted fabric 11 is pulled in toward the other ground knitted fabric 12, the concave shape is surely formed at the time of the thermal deformation along the inner surface of the mold and the fixing of the shape. Incidentally, by extending the side portions 12a, 12a of the other ground knitted fabric 12 outward, the other ground knitted fabric 12 is disposed in portions, of the polyurethane foam layer 30, which form bulging portions on side portions of the seat cushion 120 (or the seat back 110). The polyurethane foam layer 30 has a property of being relatively weak against a shear force, and therefore, thus burying the ground knitted fabric 12 results in the formation of a high-stiffness surface in the polyurethane foam layer 30, which serves for increasing the strength against the shear force.

FIG. 7(f) is a view illustrating an example in which the sewing for pulling the center portion 11b of the ground knitted fabric 11 toward the other ground knitted fabric 10 as illustrated in FIG. 7(d) and FIG. 7(e) is not performed before the integrated foaming. In this example, the foaming pressure of the polyurethane foam raw material pushes up the center portion of the other ground knitted fabric 12 into the sparse portion 13a located in the center portion of the three-dimensional knitted fabric 10 and not having the connecting yarns 13. Therefore, the polyurethane foam raw material foams in a state where the center portion of the other ground knitted fabric 12 is joined to the center portion of the ground knitted fabric 11, and is integrated. Therefore, providing such a sparse portion 13a makes it possible to easily form the concave shape of the seating surface without relying on the sewing.

FIG. 8(a) and FIG. 8(b) illustrate an example where the polyurethane foam layer 30 is integrally foam-molded with an integration target in which the three-dimensional knitted fabric 10 is joined to the skin layer 20, and in this structure, a surface is formed in a ridge shape. In order to form ridge portions, sparse portions 13d without any connecting yarns 13 as in FIG. 7(c) are formed at positions corresponding to gaps between the adjacent ridges. Then, in order to form the ridge portions, facing portions of the ground knitted fabrics 11, 12 may be stitched together via the sparse portions 13d as in FIG. 7(d). Alternatively, on the inner surface of the mold 40, protrusions are formed at positions corresponding to the sparse portions 13d, and the protrusions are made to enter the inside of the sparse portions 13d via the skin layer 20, so that the shape is fixed by the polyurethane foam layer 30 and the skin layer 20 at the time of the foam-molding of the polyurethane foam layer 30, which makes it possible to very easily form the ridge portions having elasticity.

FIG. 9(a) and FIG. 9(b) are views illustrating an example where the working is done so that a plurality of substantially circular convex portions appear on the surface of the skin layer 20. Concretely, the knitting is done so that sparse portions 13e where the connecting yarns 13 of the three-dimensional knitted fabric 10 are not disposed are formed at positions corresponding to concave portions between the convex portions. Thereafter, concaves/convexities in an inversed state are formed on the inner surface of the mold 40 and the polyurethane foam layer 30 is integrally foam-molded. As a result, the skin layer 20 is fixed to the polyurethane foam layer 30 via the sparse portions 13e, so that a dimple shape where the plural convex portions appear on the surface can be set. Note that the surface shape is not limited to this, and it is a matter of course that the surface shape can be any of various shapes.

Figure 10:
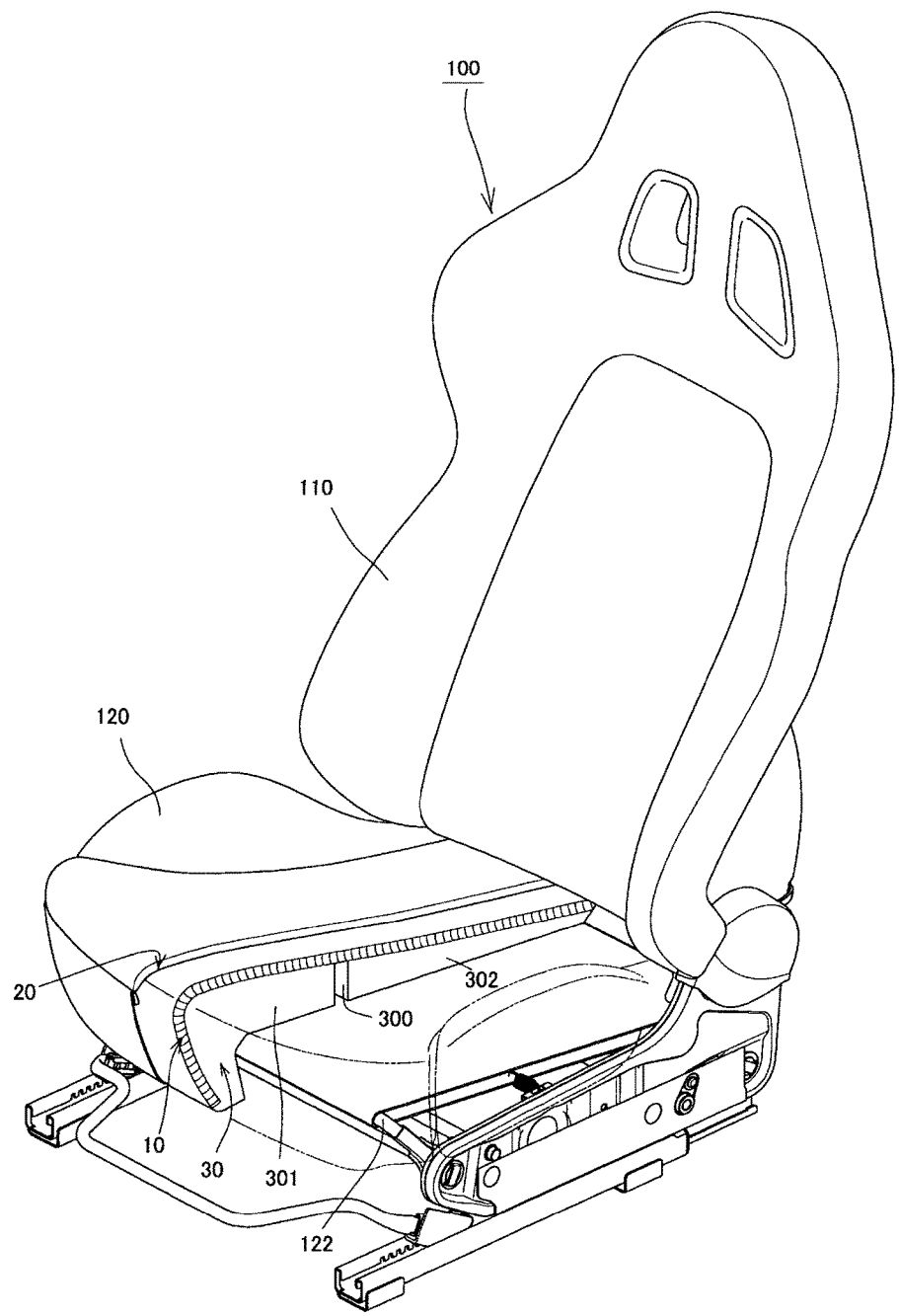
FIG. 10 is a perspective view of an automobile seat, with a seat cushion in which a slit is formed in the polyurethane foam layer being partly in section.
Figure 11:
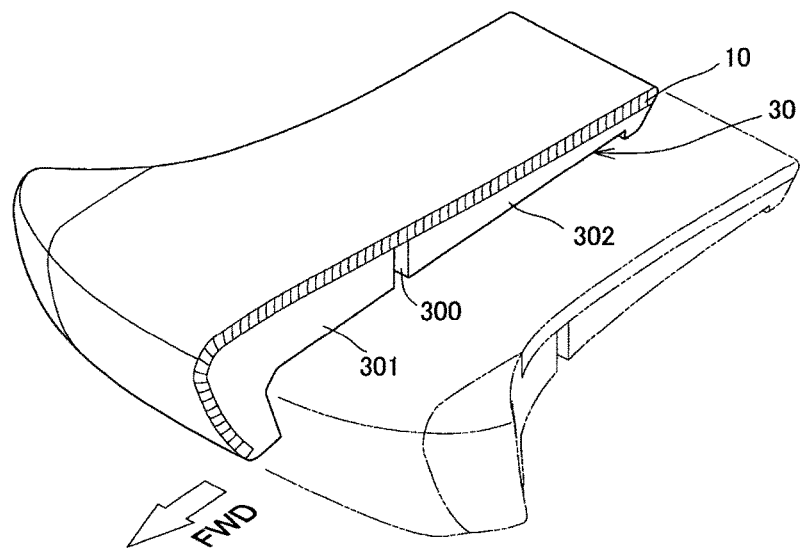
FIG. 11(a) is a detailed view illustrating the seat cushion in FIG. 10 seen from a flat surface side.
FIG. 11(b) is a detailed view thereof seen from a rear surface side.
Figure 11:
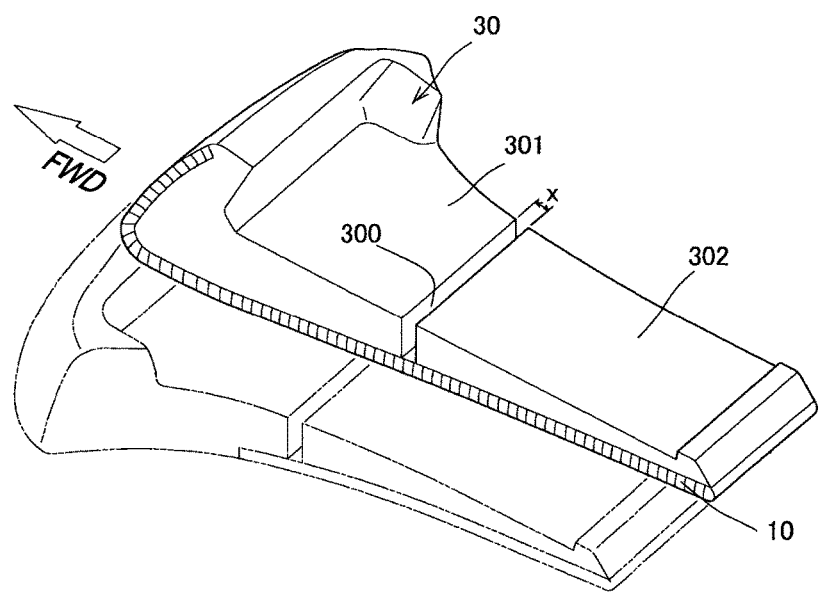
Figure 12:
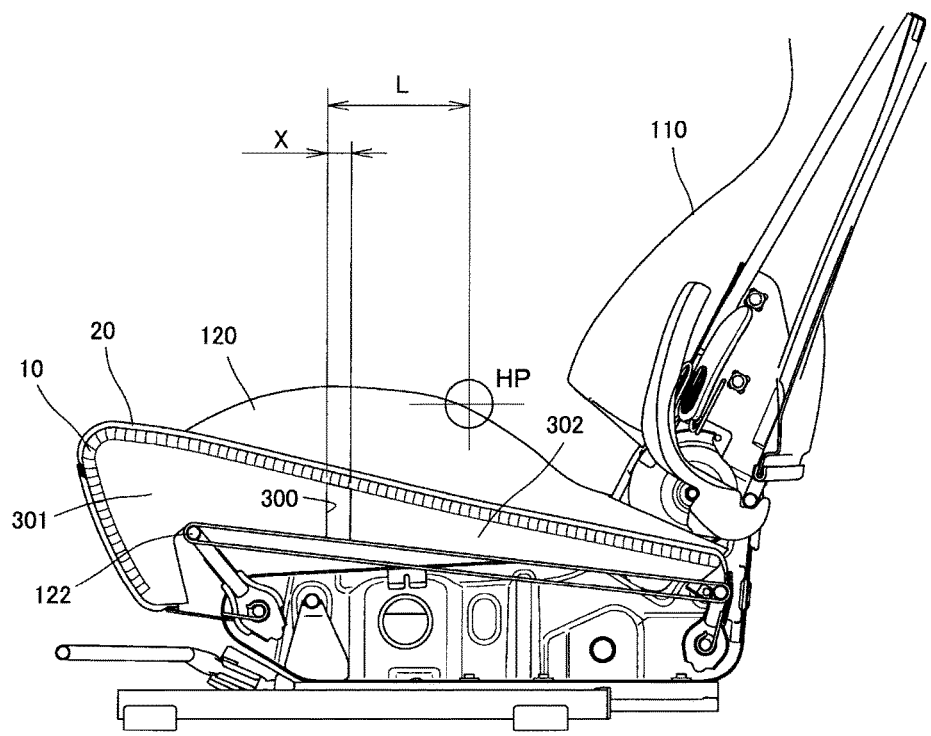
FIG. 12 is a vertical cross-sectional view of the seat cushion in which the slit is formed.

Next, an example where a slit 300 is formed in the integrally foam-molded polyurethane foam layer 30 within a range where the three-dimensional structure having air permeability continues. FIG. 10 is a perspective view of an automobile seat 100, with the seat cushion 120 partly in section. FIG. 11(a) and FIG. 11(b) are views illustrating details of the seat cushion 120 in which the slit 300 is provided, (a) being a view seen from a flat surface side and (b) being a view seen from a rear surface side. FIG. 12 is a vertical cross-sectional view of the seat cushion 120. As illustrated in these drawings, the slit 300 is formed in the polyurethane foam layer 30 within the range where the three-dimensional knitted fabric 10 with the skin layer 20 forming the seat cushion 120 continues.

Figure 13:
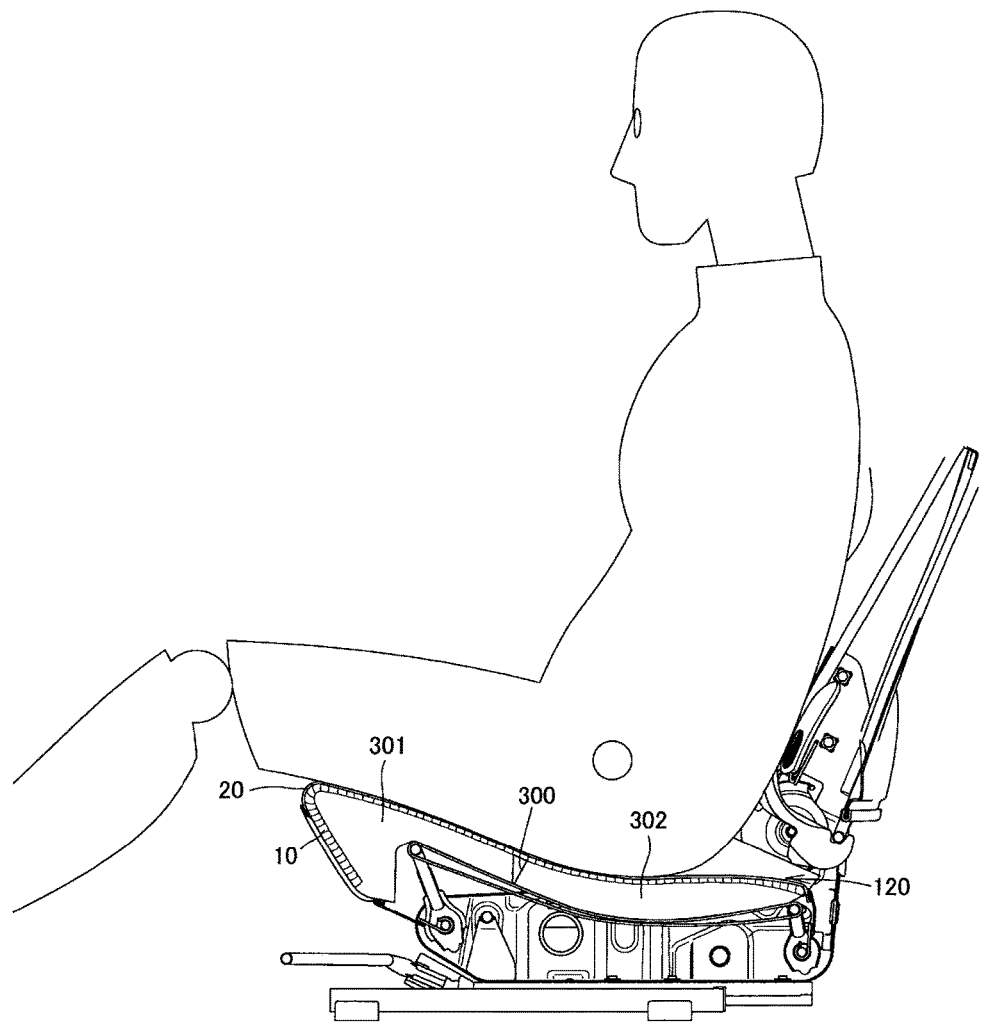
FIG. 13 is an explanatory view of the operation of the seat cushion in which the slit is formed.

The slit 300 is formed at a position deviated toward a front edge from a center portion of the seat cushion 120 in terms of the front and rear direction, preferably at a position deviated toward the front edge by a 100 mm to 150 mm distance from a hip point (HP) (sign L in FIG. 12), so as to have a shape cut out from the rear surface side along a left and right direction of the seat cushion 120 (refer to FIG. 11(a) and FIG. 11(b)). Concretely, a protrusion having length and width corresponding to those of the slit 300 is formed at a corresponding place of the mold, followed by the integrated molding, so that the shape cut out from the rear surface side is obtained. Since this slit 300 is formed only in the polyurethane foam layer 30, the polyurethane foam layer on a front side (front polyurethane foam layer 301) and the polyurethane foam layer on a rear side (rear polyurethane foam layer 302) which are disposed across the slit 300 are connected via the three-dimensional knitted fabric 10. Therefore, when a lower surface of the front polyurethane foam layer 301 is supported, the rear polyurethane foam layer 302 turns in a downward direction on a fulcrum, that is, on a portion, of the three-dimensional knitted fabric 10, existing at a position corresponding to the slit 300, by an amount corresponding to a width (slit width) X of the slit 300. That is, the rear polyurethane foam layer 302 displaces in such a direction as to be approached by the lower end of the slit 300 as illustrated in FIG. 13.

As illustrated in FIG. 10 to FIG. 13, in this example, the lower surface of the front polyurethane foam layer 301 is disposed on and supported by the cushion frame 122 located near the front edge. Consequently, when a person is seated, the rear polyurethane foam layer 302 displaces downward by the predetermined amount as described above, which can increase a feeling of stroke. Further, since a seating angle is made, the posture at the time when the person is seated is stabilized. Further, an input vibration can be easily absorbed by the up and down movement, which contributes to a further improvement of a vibration characteristic. The slit width X is a width necessary for the rear polyurethane foam layer 302 to make such a movement and is appropriately decided according to a desired displacement amount, a desired seating angle, the thickness and material of the polyurethane foam layer 30, the thickness and material of the three-dimensional knitted fabric 10, the thickness and material of the skin layer 20, and so on, but the slit 300 preferably has a thickness within a 15 mm to 30 mm range in order for the aforesaid operation to be exhibited. A depth of the slit 300, its length along the left and right direction of the seat cushion 120, and so on can be also appropriately decided in order to obtain a desired property similarly to the slit width X.

Further, the slit 300 can be formed not only at one place as illustrated in these drawings but also at a plurality of places. Further, a place where to form the slit is not limited to the seat cushion 120, and the similar slit can also be formed in the seat back 110, the headrest, or the like. This can realize a further improvement of the vibration absorbing property and in addition an improvement of the climate in the seat (temperature, moisture, air flow), sitting comfort (prevention of hip slipping), a pelvis support shape (seating angle), and so on. In this case, in consideration of the formation position and so on of the slit, the shape of the slit is not limited to a linear shape and may be a curved shape, or a plurality of slits may be formed in part, or a plurality of slits different in slit width may be formed.

In any case, the present invention is characterized in that the integration target such as the three-dimensional knitted fabric 10 with the skin layer 20 is integrally molded with the polyurethane foam layer 30, and even when the slit is formed, since the three-dimensional knitted fabric 10 connects one side and the other side which are disposed across the slit, the operation that the one side is displaceable relatively to the other side is obtained, and by applying the present invention to a vehicle seat, it can be used for improving the aforesaid various properties such as the vibration absorbing property Further, since the slit 300 can be formed simultaneously by the integrated foaming using the aforesaid mold, and therefore, a separate step for forming the slit 300 is not necessary, and even when the slit 300 is formed, the steps do not become complicated and manufacturing cost does not increase, which is suitable for the present invention.

According to the present invention, the foaming heat generated at the time of the foaming of the polyurethane foam raw material, whose influence has conventionally been prevented by contriving a special measure, is positively used. The integration target is influenced by foaming heat generated at the time of the foaming of the polyurethane foam raw material in the mold, to thereby thermally deform into a desired shape along the shape of the mold. Consequently, the integration target can be molded into an arbitrary shape in the step of integrating the integration target with the polyurethane foam layer in the mold by the integrated foaming, and there is no need to work the integration target into a state close to the final shape in a step before it is disposed in the mold, which can simplify manufacturing steps and reduce manufacturing cost.

Further, in the case where the integration target is made of the three-dimensional structure having air permeability, by using the pressure of the gas generated at the time of the foaming of the polyurethane foam raw material, the gas flows in the three-dimensional structure and serves as a pressure resisting the foaming pressure of the polyurethane foam raw material, which can be used for retaining the shape of the three-dimensional structure. Consequently, it is possible to thermally deform the three-dimensional structure by the aforesaid foaming heat while making an effective use of a compression property that the three-dimensional structure originally has.

The manufacturing method of the integrated foam-molded product of the present invention is suitably used in the manufacture of an integrated foam-molded product as a seat cushion, a seat back, a headrest, or an armrest in a vehicle seat of an automobile, an airplane, a train, a ship, or a bus, and is effective when the polyurethane foam layer is made thinner to be more light-weighted than conventionally, and is also effective for forming a high-stiffness surface in the polyurethane foam layer.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A manufacturing method of an integrated foam-molded product which injects a polyurethane foam raw material into a mold to foam the polyurethane foam raw material and integrates an integration target disposed in the mold with a polyurethane foam layer, the method comprising:

thermally deforming the integration target by foaming heat generated at the time of the foaming of the polyurethane foam raw material to mold the integration target into a predetermined shape, and obtaining an integrated foam-molded product in which the integration target is integrated with the polyurethane foam layer, wherein the integration target is made of a three-dimensional structure having air permeability and comprising a three-dimensional knitted fabric having a pair of ground knitted fabrics and connecting yarns knitted back and forth between the ground knitted fabrics, wherein the integration target is molded into the predetermined shape by the thermal deformation along the inner surface of the mold while a pressure of gas generated at the time of the foaming of the polyurethane foam raw material is used for shape retention of the three-dimensional structure, integrating the three-dimensional structure with the polyurethane foam layer in the mold while suppressing an entrance of the polyurethane foam raw material into gaps between the connecting yarns through the ground knitted fabric by the pressure of the gas, and joining a skin layer to at least part of the three-dimensional knitted fabric to provide the integration target as a skin layer joined three-dimensional structure, wherein as the three-dimensional knitted fabric, a gray fabric not having undergone a heat setting process is used, and wherein, when the skin layer is joined to the gray fabric of the three-dimensional knitted fabric, the skin layer is joined so as to have a slack relatively to the gray fabric between joined portions.

2. The manufacturing method of the integrated foam-molded product according to claim 1, wherein the three-dimensional structure forming the skin layer-joined three-dimensional structure at least partly has a sparse portion that is formed as a sparser structure than a peripheral portion or formed as a void, and the polyurethane foam layer is fixed to the skin layer via the sparse portion.

3. The manufacturing method of the integrated foam-molded product according to claim 2, wherein the skin layer and the three-dimensional structure forming the skin layer-joined three-dimensional structure are joined to each other by sewing or melt adhesion, or via a hook-and-loop fastener.

4. The manufacturing method of the integrated foam-molded product according to claim 1, wherein part of the ground knitted fabric included in the three-dimensional knitted fabric is disposed in the polyurethane foam layer.

5. The manufacturing method of the integrated foam-molded product according to claim 1, the method being applied to manufacturing of an integrated foam-molded product forming a seat cushion, a seat back, a headrest, or an armrest of a vehicle seat.

* * * * *